Aug. 13, 1940.   A. C. ROUTH   2,211,387
MATERIAL PROCESSING METHOD AND APPARATUS
Filed May 6, 1937   4 Sheets-Sheet 1
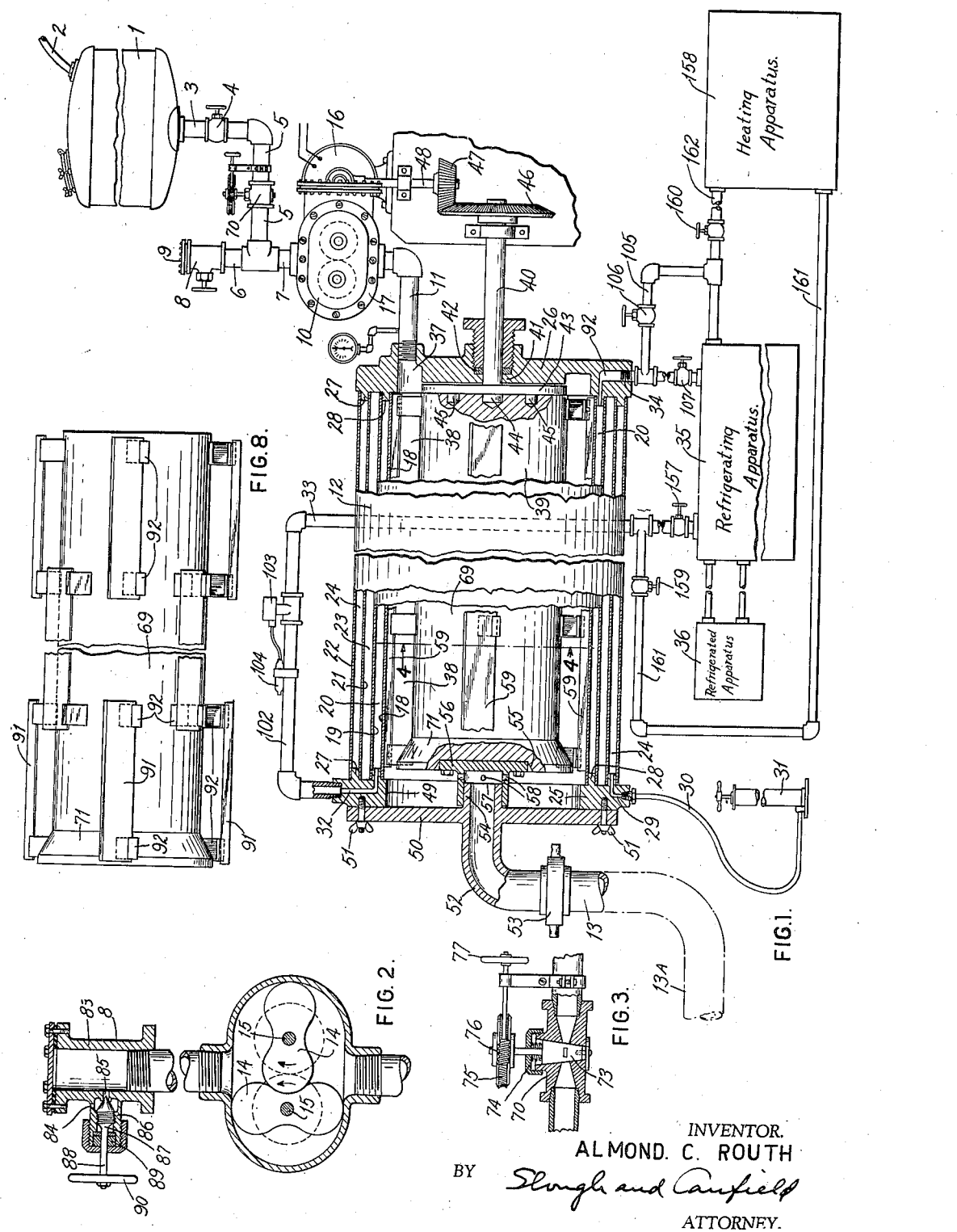
INVENTOR.
ALMOND. C. ROUTH
BY Slough and Canfield
ATTORNEY.

Aug. 13, 1940.  A. C. ROUTH  2,211,387

MATERIAL PROCESSING METHOD AND APPARATUS

Filed May 6, 1937   4 Sheets-Sheet 2

INVENTOR.
ALMOND C. ROUTH.
BY Slough and Caufield
ATTORNEY.

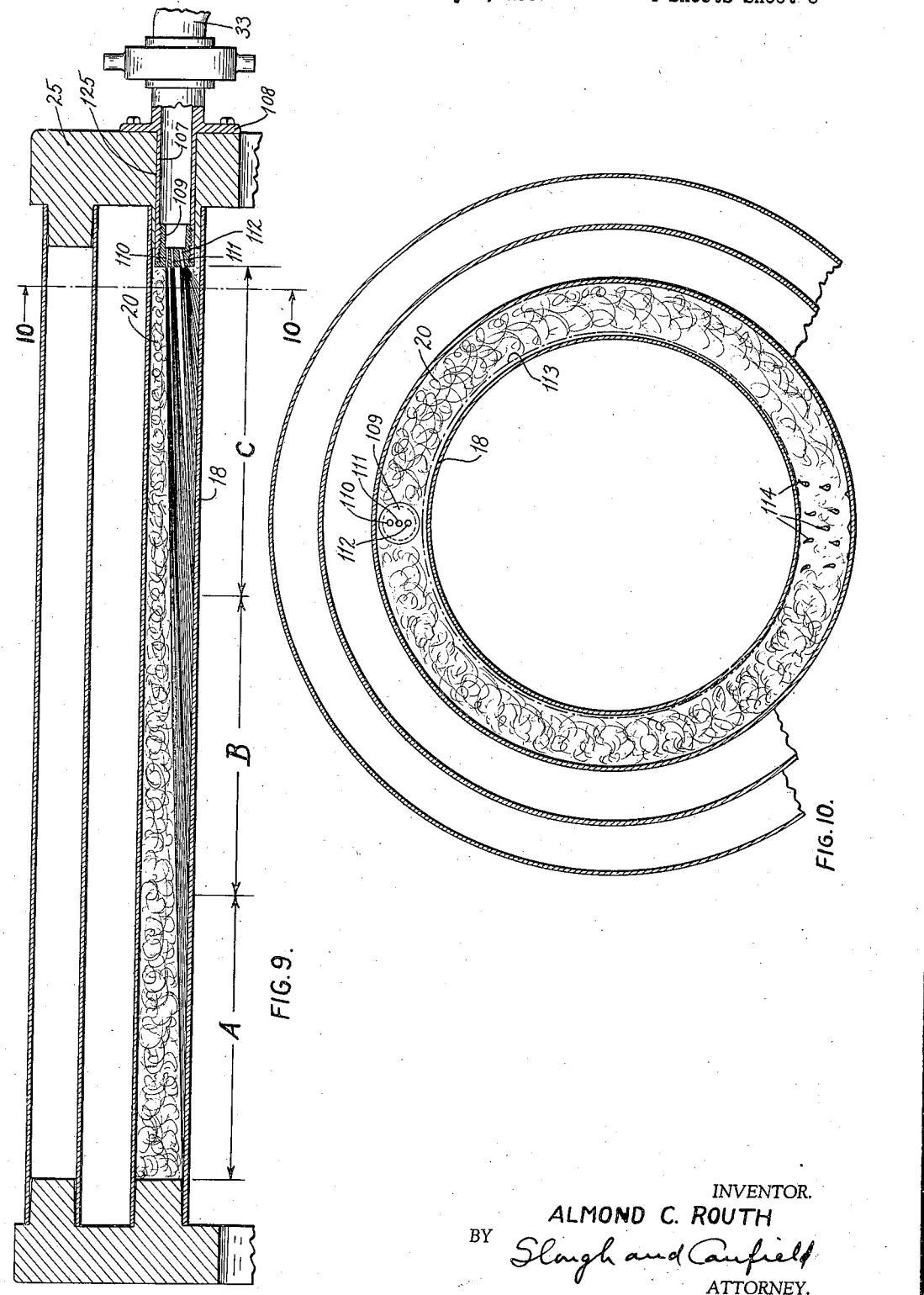

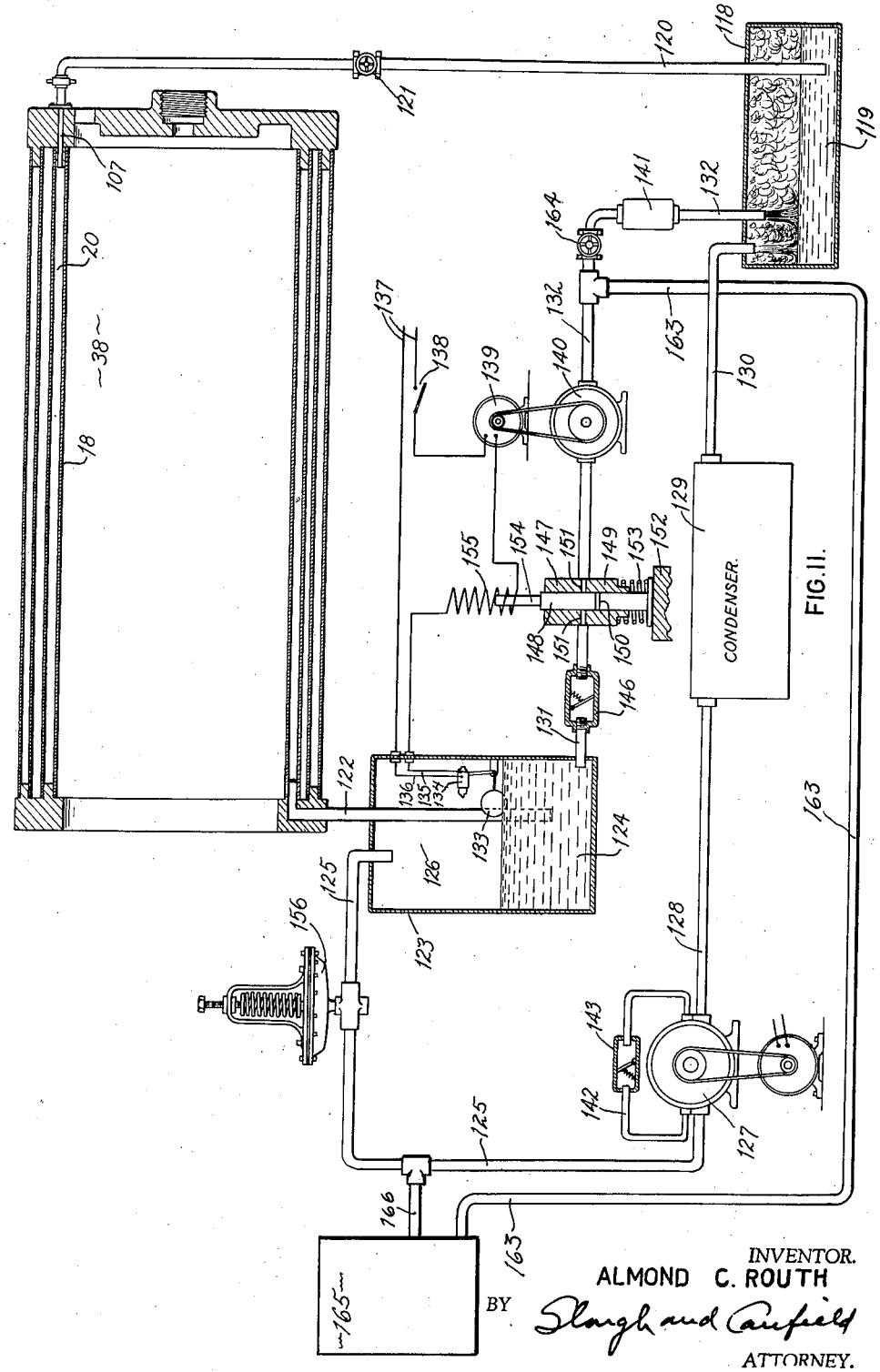
FIG.II.

Patented Aug. 13, 1940

2,211,387

UNITED STATES PATENT OFFICE 2,211,387

MATERIAL PROCESSING METHOD AND APPARATUS

Almond C. Routh, Sandusky, Ohio

Application May 6, 1937, Serial No. 141,185

20 Claims. (Cl. 62—114)

This invention relates to material processing apparatus of the class in which a fluid or semi-fluid material is beaten, agitated, or otherwise worked under controlled conditions of pressure and temperature to change the characteristics thereof; or in which a plurality of materials are agitated and mixed or incorporated one within another by mechanical treatment under controlled conditions of pressure and temperature.

As illustrative of these processes which may be performed in an improved manner by the practice of my invention may be mentioned the making of mayonnaise and other salad dressings by the thorough and stable incorporation of various materials in oil; and the changing of lard from hot liquid state into cold solid or semi-solid state while concurrently working it to make the resulting commercial lard homogeneous, uniform, and in some cases bleached and comprising a predetermined overrun of air; and the incorporation of air or other ingredients into liquid soap, lard, butter, butter substitutes, etc.; and the making of ice cream with a predetermined overrun of air, etc.

My invention may be practiced with particular advantage when the materials to be processed flow continuously through the apparatus and are continuously discharged therefrom. While all of the above mentioned illustrative processes and many others may be practiced with distinct advantages and with improved characteristics in the resulting materials, I have chosen to illustrate and describe the invention herein as applied particularly to the making of commercial ice cream by continuously freezing into ice cream, liquid mix supplied to the apparatus and concurrently incorporating thereinto a predetermined proportion of air and continuously discharging the ice cream from the apparatus.

I am aware that it has heretofore been proposed to make ice cream in this general manner; but ice cream made for commercial purposes must have certain characteristics which prior methods and apparatus have only partly provided, for example, commercial ice cream must have certain qualities of palatability, flavor, consistency, melting characteristics, appearance, etc., to please the consumer; and also to satisfy the retailer who handles it, it must be uniform in texture and hardness; must not change in quality during the period that a wholesale quantity such as a 5-gallon can full is being retailed a scoop full at a time; and must separate from the mass in the can or container, when being scooped up, in a manner to yield the maximum number of standard scoop fulls per gallon; and must not unduly adhere to the scoop, etc.

Now it is obvious and well known that ice cream as continuously delivered from a continuous freezer may be varied as to these aforesaid qualities by varying the formula of the ice cream mix. But so far as I am aware, it is not known, even by those highly skilled in this art, to what extent these aforesaid qualities of ice cream are dependent upon the mechanical treatment to which the mix is subjected during the freezing thereof, nor to what extent these qualities will vary, for a given mix formula, when the mechanical treatment is varied. Furthermore, I have found that certain undesirable qualities of ice cream produced by wrong mechanical treatment cannot be eradicated by any change in the ice cream mix formula without of course changing it so much that when frozen it is no longer true ice cream.

It is therefore an object of this invention:

To provide an improved process or mechanical treatment for converting refrigerated ice cream mix of a given formula or recipe, continuously into ice cream, and an improved apparatus for carrying out the process;

To provide an improved apparatus and method for continuously making ice cream whereby for a given formula of mix the mechanical treatment of the mix during its conversion into ice cream may be adjustably varied to effect desired qualities of the ice cream;

To provide an improved apparatus and method whereby ice cream, ices, sherbets, etc., may all be made with equal facility and having desired qualities, by suitable adjustments and variations of the controlling features of the process and elements of the apparatus;

To provide an apparatus and process of making continuously ice cream having improved qualities rendering it more pleasing to the consumer and rendering it more satisfactory to the dealer as a retailable article;

To provide an improved construction of ice cream continuous freezer, and means to refrigerate the same;

To provide generally an improved method and apparatus for processing fluid materials by mechanical treatment under controlled conditions of temperature and pressure;

To provide an improved means for refrigerating or treating material while being processed;

To provide an improved refrigerating apparatus adapted to refrigerate material being processed;

To provide an improved apparatus for mechanically treating fluid or semi-fluid materials.

Other objects will be apparent to those skilled in the art to which my invention appertains.

My invention is fully disclosed in the following description taken in connection with the accompanying drawings in which:

Fig. 1 is a view in some respects diagrammatic of an apparatus embodying my invention and by which the method of my invention may be practiced, some of the parts of the apparatus being illustrated in section and other parts broken away for clearness;

Figs. 2 and 3 are views illustrating to enlarged scale and in cross section, parts illustrated in elevation in Fig. 1;

Fig. 8 is a view of the drum and blades of Figs. 1 and 4 to 6 inclusive but illustrating another arrangement of the blades;

Fig. 9 is a fragmentary view to an enlarged scale of a freezing chamber illustrated in Figs. 1, 4 and 5 and illustrating a modification of the means for refrigerating the wall thereof;

Fig. 10 is a sectional view taken from the plane 10—10 of Fig. 9, and

Fig. 11 is a diagrammatic view illustrating a modification of the means for refrigerating the freezing chamber of Fig. 1.

Figures 4, 5:
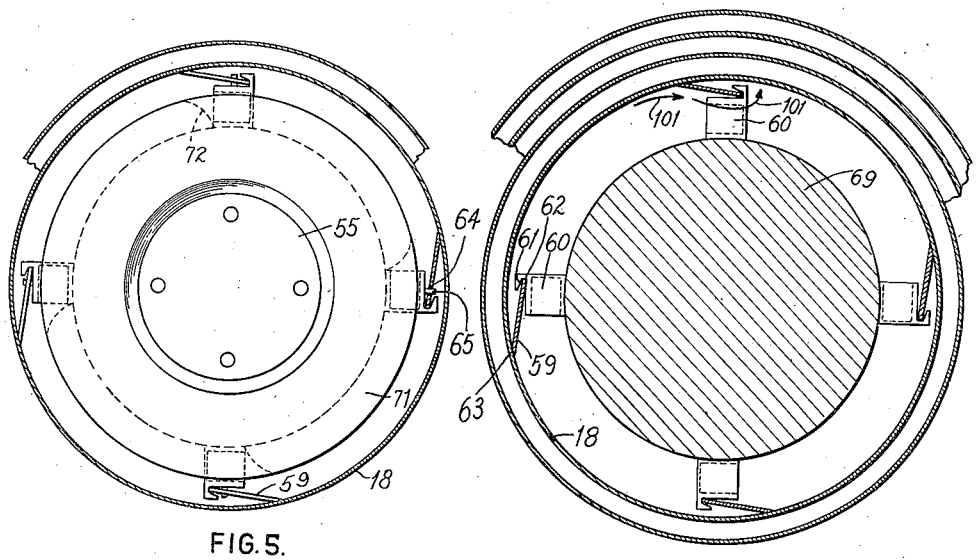
Fig. 4 is a fragmentary sectional view taken from the plane 4—4 of Fig. 1 or Fig. 6 and drawn to a larger scale.
Fig. 5 is a fragmentary view to an enlarged scale taken from the plane 5—5 of Fig. 6.
Figure 6:
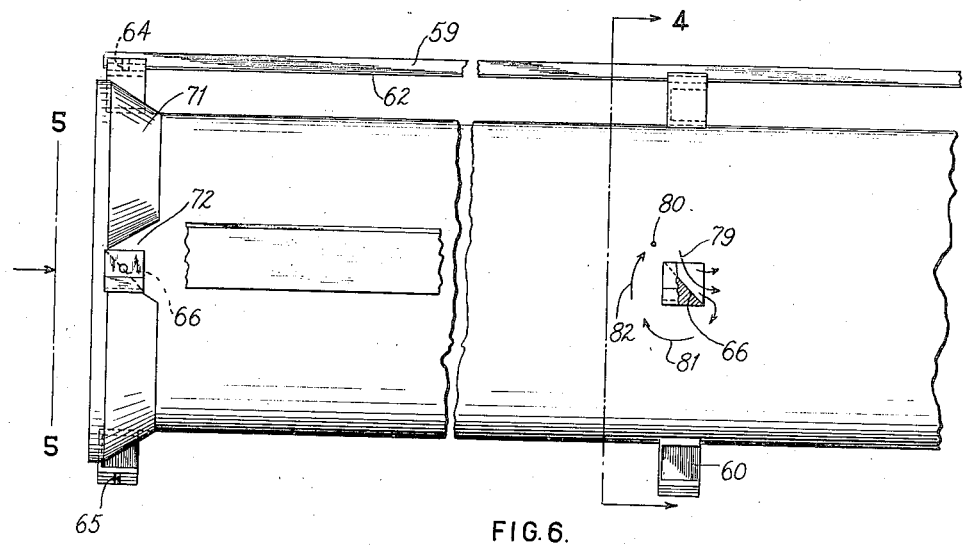
Fig. 6 is a fragmentary elevational view of a part of Fig. 1 drawn to a larger scale.

Referring to the drawings, I have shown at 1 a reservoir or tank containing liquid ice cream mix which may be supplied thereto through a pipe 2 from suitable mixing apparatus not shown. The reservoir 1 communicates at a lower portion thereof with a conduit 3 controlled by a cut off valve 4, the conduit 3 communicating with a horizontal conduit 5. A valve construction 70, to be more fully described, controls flow through the conduit portion 5.

The conduit 5 connects with a pair of branches 6 and 7, the branch 6 having an air inlet valve 8 associated therewith and to be more fully described, the outer end 9 of the conduit 6 being closed. The conduit 7 is the intake conduit of a pump 10, discharging into a pump discharge conduit 11, which communicates with one end of the freezer 12, the other end of the freezer being connected to a freezer discharge nozzle 13. The nozzle 13, shown in solid line, may discharge into a can or other receptacle to contain the ice cream for further hardening and commercial distribution, or as shown in dotted line may have a horizontal extension 13A, from which the ice cream may be extruded in the form of a bar, and by various fabricating apparatus hardened and converted into saleable pieces.

The pump 10 may be of any suitable or known construction but I prefer to employ a pump of the positive displacement type. One form of such pump is illustrated in the drawing in cross section in Fig. 2 and is of the double impeller type having a pair of involute or like intermeshed impellers 14—14, supported on rotatable shafts 15—15, rotated by means of an electric or other motor 16, and enclosed in a pump housing 17, see Figs. 1 and 2. Such pumps are well known and need not be further described herein, and as is well known such pumps are capable of creating a positive suction or partial vacuum on the intake side thereof, for example in the conduit 7, and a positive pressure on the discharge side, for example in the conduit 11.

The motor 16 preferably drives the pump at a constant speed, this being one of the advantages of my invention, and control apparatus for controlling the speed of the motor, as required in some prior systems, is unnecessary in the apparatus described herein as will hereinafter appear.

The freezer 12 while it may be variously constructed comprises in the form illustrated an inner sheet metal cylindrical freezing wall 18 providing a chamber 38 therewithin through which the mix being frozen flows, surrounded by a cylindrical sheet metal wall 19 spaced therefrom radially, thus providing a chamber for the circulation of brine or other refrigerant around the freezing wall 18 to chill the same to freezing temperature. Surrounding the two main walls 18 and 19 are two other cylindrical walls 21 and 22 which provide an air containing insulating space 23 between the walls 19 and 21 and an insulating vacuum chamber or space 24 between the two outer walls 21 and 22. The walls are clamped between end heads 26 and 25, each cylindrical wall being pressed around the outside or pressed within the inside, as the case may be, of annular tapered beads 27 and 28 on the heads 25 and 26. The chambers are by this means all sealed at their ends.

A passageway 29 is provided communicating with the chamber 24 and externally with a pipe 30 by which, through the agency of a vacuum pump 31, vacuum may be produced in the chamber 24.

A passageway 32 in the head 25 leads from the refrigerant chamber 20 to a circulating pipe 33 and a like pipe 34 communicates through the opposite head 26 with the chamber 20 by a passageway 92. The pipes 33 and 34 may be connected to any refrigerating apparatus not shown which in many cases will be a refrigerating plant already installed and being used for other purposes. It therefore may be the case that the temperature available at the freezer 12 which, of course, is the freezing temperature available to freeze the mix into ice cream in the freezer, may be dictated not by the freezer and its requirements, but by the other apparatus supplied by the same refrigerating plant. At 35 is indicated diagrammatically the refrigerating apparatus supplying refrigerant to the freezer 12, and at 36 is diagrammatically illustrated other apparatus supplied by the same plant.

The conduit 11 communicates with the interior of the chamber 38 through an aperture 37 in the head 26 with which it is sealedly connected.

A rotor illustrated generally at 39 and to be more fully described rotates within the chamber 38 and is rotatably driven by the following means.

A shaft 40 extends through a bearing 41 in the head 26 wherein it is sealed by a gland 42 and inwardly of the head 26 has thereon a driving head 43 provided with a central centering pin 44 and, radially spaced therefrom, driving prongs 45—45. The shaft, outwardly of the head 26 has thereon a bevel gear 46 meshed with a bevel gear 47 connected to a vertical shaft 48 driven by the motor 16 directly or through suitable reduction gearing.

The opposite head 25 has a central aperture 49 therein outwardly closed by a coverplate 50 detachably secured to the head 25 in any suitable manner, for example by wing nuts 51—51. The coverplate 15 has formed thereon a conduit 52, a portion of which extends inwardly from the coverplate into the aperture 49 in the form of a short cylindrical tube 54. Externally of the coverplate, the conduit 52 is adapted to be connected to the above mentioned nozzle 13 by a coupling 53.

The above mentioned rotor 39 comprises a drum 69 which may be of solid metal or other material, or may be hollow to reduce its weight, and at one end, the right end as viewed in Fig. 1, it is provided with recesses adapted to receive the centering pin 44 and the prongs 45—45, which thereby support the rotor at the end upon the driving head 43 and also serve to transmit rotary movement thereto from the shaft 40. The opposite end of the drum 69 is slightly hollowed out as at 55 and secured to the drum in the hollowed out end is a tubular bearing 56 telescoped over the cylindrical tube 54 above described. The tube 54 is relatively short so that a considerable space in the axial direction is left between the end 57 of the tube 54 and the inner end of the tubular bearing 56. A plurality of holes 58—58 are provided through the wall of the tubular bearing 56 and thus effect restricted communication between the aperture 49 in the head 25 and the interior of the tubular bearing 56 which communicates as shown with the conduit 52 through the tube 54.

The tubular bearing 56 cooperating with the tube 54, rotatably supports the left-hand end (as viewed in Fig. 1) of the drum 69.

The drum 69 is generally cylindrical, its outer surface being spaced at all points from the freezing wall 18. The chamber 38 is therefore of annular form. The drum has mounted thereon a plurality of scraper blades 59—59, the blades extending longitudinally of the drum and mounted thereon as will now be described in connection with Fig. 1 and Figs. 4 to 7 inclusive.

The drum 69 has secured to its outer surface, longitudinal rows of blade supports 60—60 which extend radially from the drum, and at portions thereof radially spaced from the drum have each a groove 61 therein, the groove of one support aligned axially with the grooves of the other supports of the row, and with the grooves of the supports facing in the direction of rotation of the drum. Each of the scraper blades 59 has a rearward edge 62 seated in the aligned row of grooves, the opposite edge 63 being beveled to sharpen it and being engageable with the inner surface of the wall 18, the rearward edge 62 of the blade having a rocking or hinging articulation with the supports 60—60.

Figure 7:
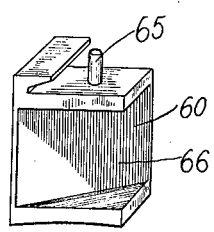
Fig. 7 is a perspective view illustrating an element of the apparatus of Fig. 1 and shown also in Figs. 4, 5 and 6.

The supports 60—60 are preferably equally spaced from end to end of the drum 69, and each blade is secured at opposite ends to the end supports by means of a perforation 64, see particularly Figs. 7 and 8 in the blade telescoped over a pin 65 projecting upwardly from the end support 60. The blades may be assembled with their supports by seating the back edge 62 in the aligned grooves and then rocking the blade to telescope the perforations over the pin. This may be done before inserting the drum into the chamber 38, and thereafter the engagement at the outer edge 63 of the blade with the wall 18 prevents rocking of the blade sufficiently to remove it from the pin 65. While the supports 60—60 are generally of rectangular block form two of the sides of the block are cut away along a diagonal surface 66. These surfaces are disposed generally helicoidally of the drum so that when the tubular chamber 38 is filled with ice cream or mix as will be more completely explained hereinafter, the surfaces 66 sweeping therethrough will tend to propel the ice cream in the direction opposing its pump-impelled flow.

The left-hand end of the drum 69 increases relatively abruptly in diameter being of frustoconical form as shown at 71 so that the adjacent end of the tubular chamber 38 is of restricted cross sectional area. The supports 60—60 at this end of the rotor are seated in recesses 72 in the frusto-conical surface so that the ice cream adjacent the end supports 60 may flow over their inclined surfaces 66—66.

The valve 70 referred to hereinbefore in the line of flow of the mix from the reservoir 1 to the pump 10 throttles or restricts the flow of the mix to the pump. This valve may be of any suitable construction. The preferred form, illustrated in Figs. 1 and 3, is of the spigot type comprising a tapering spigot-shaped valve element 73 having, extending therethrough transversely, a relatively thin slot-like passageway which upon rotation of the valve element 73 adjustably, variably restricts the flow through conduit in a well known manner. The valve element 73 has a stem extending outwardly through the conduit wall to a gland 74 and has a worm gear 75 thereon. A worm 76 meshed with the worm gear has a handle 77 thereon to turn the worm to adjust the valve.

As stated above, an air inlet valve 8 is provided. It is a common practice in the manufacture of ice cream for various purposes to mix or incorporate into the ice cream a certain amount of air, and the resulting increase of volume of the mass is known in the art as the "overrun." In order that the correct amount of air shall be admitted and accurately controlled, the valve 8 is constructed as more particularly shown in Figs. 1 and 2.

A valve housing 83 is provided for the valve, having an air inlet duct 84, and a valve port 85, therein. A boss 86 is formed on the outside of the housing 83 and a longitudinally movable valve 87 is threaded therein having a needle-point controlling the valve port 85. The stem 88 of the needle valve is packed by a gland 89 which may be of well known construction. The effective size of the port 85 may be varied by rotating the valve 87 by means of a handle 90 on the valve stem 88.

The suction of the pump 10 draws air through the duct and discharges it with the liquid ice cream mix. The air is incorporated and mixed with the ice cream by the agitation which occurs within the chamber 38 which will be more fully described.

The operation of the apparatus thus far described is as follows: With the coverplate 50 removed, the complete rotor 39 may be withdrawn longitudinally out through the aperture 49 and to facilitate the thorough cleaning of the inside of the freezer. Upon reinserting the rotor into the freezer, the blades 59—59 may be rocked by hand inwardly which gives them clearance with the inside of the wall 18, and the inner end of the rotor may be telescoped over the pin 44 and prongs 45. The coverplate 50 is then replaced, inserting the short tube 54 into the tubular bearing 56.

The motor and pump may be now started, and mix accompanied by a suitable proportion of air, under the control of the valves 70 and 8 respectively, will flow into the freezer, through the conduit 11, entering the tubular chamber 38.

Where it contacts with the wall of the freezer, it is chilled and, beyond a point between the ends of the freezer, freezes in a film on the freezer wall.

Rotation of the drum 69 moves the blades 59 through the contents of the chamber 38 and this together with centrifugal force acting on the blades, rocks them outwardly to engage the wall 18, and scrape off the frozen film from the wall. It is for this purpose that the outer edges 63 of the blades are sharpened. The blades 59 are relatively thin and flexible and therefore will bend if necessary to conform to slight irregularities of the wall 18 so that the scraping operation is performed efficiently. The blades are free to hinge about their rearward edges and are held in pressure engagement with the freezer wall by the mix and ice cream through which they flow and by centrifugal force.

Referring to Fig. 4, the movement of the frozen film of cream scraped off from the wall 18 is indicated by the arrow 101. It flows downwardly along the underside of each blade 59, over the entire width of the blade, and then passes under the rearward edge of the blade, mixing with unfrozen parts of the mass more nearly adjacent the surface of the drum 69. The flowing mass nearer the drum 69 will flow outwardly and around behind the blade 59 and into contact with the freezing wall 18, to be scraped off by the next following blade. Thus the entire mass is converted from liquid mix into ice cream during its passage longitudinally through the chamber 38. Ultimately it emerges from the chamber into the aperture 49, whence it flows radially inwardly through the holes 58—58 and thence into the conduit 52 and out at the nozzle 13.

I have found that the finished ice cream produced by the apparatus above described will be more uniform and have other desirable qualities if the mix and ice cream flowing through the chamber 38 be kept under pressure. To this end the holes 58—58 may, if desired, be made small enough to produce this pressure; but I prefer to rely for pressure upon the action of the supports 60—60.

As the supports 60—60 rotate through the fluid mass with the drum 69, their inclined faces 66—66 plow through the mass of mix and ice cream and propel the mass against the direction of the main flow; and this not only in general mixes the mass of material to aid in rendering it homogeneous but also performs the special additional function of opposing the flow yieldingly, and thus produces desired pressure in the freezer. These supports, constructed as shown and described, furthermore deflect and pump and thoroughly mix the fluid mass without churning or beating it. At each support 60, as shown by the arrow 79, Fig. 6, as it passes through the mass, the face 66 of the support forces the fluid material rearwardly and tends to create a vacuum at the point 80; thus causing the mass to also circulate around the support as shown by the arrows 81—82. Besides the advantages of this action mentioned above, the mass of material, by being forced to circulate around each support 60, is prevented in every instance from adhering to the drum and rotating therewith. This sometimes occurs in known constructions of freezers and forms a hollow core in the mass within which the rotor drum rotates.

When the frozen ice cream has reached the end of the chamber 38, it flows outwardly radially over the frusto-conical portion 71 of the drum and through the restricted area between it and the freezing wall 18, which restriction may be utilized as an additional means of creating back pressure.

In the foregoing, it will be noted that there are three ways or means by which back pressure may be produced to maintain the mix while being frozen under the desired amount of pressure. These means are the counterflow pumping effect of the inclined faces on the blade supports; the enlarged diameter of the rotor body at the discharge end of the chamber 38; and the holes 58—58 at the entrance to the conduit 52. While I have shown all of these means as functioning concurrently, I have found that any one of them or any combination of two or more may be utilized with satisfactory results and where commercial ice cream of one kind is being made continuously, no adjustability of the back pressure is necessary. I have found, furthermore, that the desired results can be obtained at less back pressure, with the apparatus and back pressure producing means described herein, than is possible with prior apparatus. If adjustment of the back pressure is for any reason wanted, it may be effected by the back pressure adjusting valve illustrated and described in my Patent No. 2,067,683, issued January 12, 1937; or, in the present instance, it may be adjusted by removing the tubular bearing 56 and replacing it with another having holes 58—58 of a different size.

It is also a fact that desired results can be obtained within a substantial range of back pressures, whereas in prior apparatus with which I am acquainted, very little variation of pressure can be permitted without seriously disturbing the quality of the finished product.

I have found that a suitable material for the chamber wall 18 is so-called stainless steel, but that when this material is used, it is better to use blades also of stainless steel because other materials commonly used for steel blades, such for example as carbon steel, will be rapidly abraded by the frictional pressure contact with the wall 18.

In some cases, the blades may be so long that they are difficult to fabricate without warping. In such cases, since it is always desirable that the edge of the blade shall maintain continuous longitudinal contact with the freezing wall, the blades may be made in short pieces, overlapped and staggered, as shown by the blades 91—91 of Fig. 8, the supports 92—92 for each blade being similar to the supports 60—60 above described and aligned as are those supports.

Such shorter blades can be more readily manufactured without bends or warps therein and the edges will therefore fit the scraping freezing wall 18 more accurately and scrape more efficiently. Also when short blades are employed, the blades nearest the outer end which wear more rapidly because of being held more firmly against the wall by the more completely frozen mass, may be sharpened or replaced separately from those farther toward the rear.

I have found that with an apparatus such as that illustrated and described above, ice cream of widely different quality will result if certain elements of the mechanical treatment or process performed by the machine are varied by adjustment.

If the flow valve be set to a suitable intermediate position, then the resulting ice cream will be of the ideal quality, it will appear "dry" when served and when packed in cans; it will be uniform throughout; any objectionable after-taste will be eliminated, it will not have excessive sweetness; it will melt uniformly and the true flavor of the ingredients will be present as well as a high degree of palatability and smoothness of texture; and the incorporated air will be completely retained in the mass so that it will retain its volume and the maximum of servable portions may be retailed out of a given quantity. If the valve 70 be set either too high or too low inferior cream will result.

I have likewise found that for a given setting of the flow control valve and air valve, the quality of the ice cream will be changed by changing the speed of rotation of the rotor, the higher speeds tending to produce undesirable results.

I have found also that variations of temperature at which the chamber wall 18 is refrigerated affect the resulting ice cream. If the temperature be too high, the air will be incorporated in the ice cream un-uniformly and the texture will not be uniform. A reduction of the temperature removes these defects but if the temperature is carried too low, the power required to drive the rotor through the freezing chamber becomes so excessive without any attendant advantage that a limit is reached in this direction.

Furthermore, if the flow of the ice cream through the freezing chamber is unretarded and therefore flows at low pressure, the air will not be thoroughly incorporated therein and it is for this reason among others that back pressure is provided, as above described. Also, if the velocity of the blades moving through the mass is too high or too low, or if there are too many or too few blades at any given velocity, good quality of ice cream will not be produced.

If the apparatus as initially designed and in operation is adjusted in the respects above mentioned, ice cream can be continuously produced having all of the good qualities and none of the bad ones referred to hereinbefore.

And not only can the highest grade of ice cream be made continuously by this apparatus, but sherbets and ices of equally high quality can be made continuously thereby; even according to formulae which have no fat or serum solid content whatever; in fact, pure water can be frozen into an edible "ice" having a soft snow-like texture, and so far as I am aware it has not been possible with prior continuous freezer mechanisms to freeze "ices" continuously unless containing a substantial quantity of fat or the like in the formula for lubricating purposes.

I have found that for the average ice cream mix, with an average amount of overrun, the pressure of 25 to 30 lbs. per sq. inch will give good results. In some cases, for some mixes, and to suit some tastes, 15 lbs. per sq. inch will suffice.

The ice cream as it leaves the freezer should have a temperature between 19° and 23° Fahrenheit notwithstanding that the temperature of the refrigerant applied to the freezing wall may vary through a considerable range. This will be referred to more in detail later, but it will suffice here to say that for changes of refrigerating temperature, the rate of flow of the material through the freezer should be regulated by the flow control valve 70, increasing the flow rate for lower temperatures and vice versa to maintain the above stated discharge temperature range.

It will be apparent that, for a given refrigerating temperature of the freezing wall 18, ice cream mix will freeze on the freezing wall 18 in a film; and that this film will extend from the outer end of the wall 18 back to a point somewhere between the opposite ends of the wall at which point the film begins to form and that this film, if undisturbed, will rapidly increase in thickness and if allowed to become too thick, the ice cream product will be coarse and uneven, the film apparently breaking off in pieces; and on the other hand if the film is scraped off when it is too thin, a quality of ice cream is obtained similar to that described above in connection with too slow a flow rate. The rate of increase of thickness of the film will vary with variations of refrigerant temperature. It is important therefore that the film be scraped off at a certain best thickness or range of thickness by timing the frequency of the successive blades if the rate of increase of thickness be controlled. For this reason, I find that the temperature of refrigerant applied to the freezing wall should be within a range from 0° Fahrenheit to −35° Fahrenheit and that within said range of temperatures, the film should be scraped off at a frequency of successive blade scrapes between 450 and 1,000 per minute.

If the blades at the above mentioned frequency of scrapes revolve through the mixture too rapidly they will unduly beat or churn it; and if they go too slowly there will not be enough mixing up of the removed frozen film with the unfrozen mix. I have found, therefore, that the velocity of the blades and the blade supports through the mass should be between 350 and 750 feet per minute.

The ice cream issuing from the freezer is properly considered as a mixture of unfrozen mix, and frozen scraped-off film mixed therewith in a homogeneous state. There is thus a suitable quantity of scraped-off film per gallon of delivered ice cream. Inasmuch as the film, according to the above considerations, is scraped off at a predetermined thickness, there will be a certain number of scrape-revolutions performed for each gallon of ice cream as it flows through the freezer and I have found that this is preferably between 100 and 300 scrape-revolutions per minute.

A freezer constructed as above described and having a rotor with a suitable diameter, number of blades, etc., may be driven at constant speed because of the attendant advantages of constant speed. If the refrigerant temperature applied to the freezing wall should vary, (or if when the apparatus is installed a certain refrigerant temperature only is available), then the flow regulating valve 70 is adjusted (together with the air-admission valve 8) so that the ice cream discharged from the freezer will have the above mentioned temperature range of 19° to 23° Fahrenheit; and the same quality of ice cream will result at all temperatures within the said range. It will be noted, of course, that for a lower refrigerant temperature the film will form nearer the entrance end of the freezer and therefore will extend axially farther along the freezing wall, and under such circumstances, the output in gallons of ice cream per minute will have to be larger because the valve 70 will then have to be opened more to allow more mix to flow to maintain the desired temperature of ice cream at the freezer outlet. But the scrape-revolutions per gallon will, notwithstanding, remain within the limit specified because the greater length of film is compensated for by the greater velocity of the mass flowing through the freezer and hence by the fewer scrape-revolutions occurring during its passage from one end of the freezer to the other. I have found that the axial length of film on the freezer wall is proportional directly to the gallons per minute discharged from the outlet.

Thus, the constants above mentioned when once established, may remain unchanged and the temperature of the delivered ice cream may be used as the criterion of adjustment of the flow rate for changes of refrigerating temperature; that is to say, if the refrigerating temperature should change or if a predetermined refrigerating temperature is available, the flow rate may be adjusted to cause the delivered ice cream to be within the temperature range 19° to 23° without changing the effect produced by the above described constants, etc.

The above mentioned relative constants of scrapes per minute of the blades, velocity of the blades and supports, scrape-revolutions per gallon, together with the means for creating back pressure within the cylinder, all cooperate in working the air into the mixture so thoroughly as to render it homogeneous; that is to say, in the delivered ice cream there are no perceptible bubbles or pockets of air.

This action within the cylinder to thoroughly incorporate the air in the mixture is particularly effective for a proportion of cylinder in which the length is within the approximate range of four to seven times the diameter. In other words, for the relatively high scrape-revolutions per gallon constant which I employ as above mentioned, and in a freezing cylinder approximately four to seven times as long as its diameter, the incorporation of the air into the mix begins at a greater time interval in advance of the actual freezing of the film and is carried on more intensively than in prior continuous freezers and accounts for the greater homogenity of the delivered ice cream.

The complete incorporation of air is further facilitated by the freedom of movement of the mixture in the cylinder made possible by the relatively large volumetric capacity of the chamber, that is to say, of the space between the drum and freezing wall. As of course is apparent, the freezing chamber is tubular in form comprising the tubular space between the drum and the freezing wall and I have found that the actual thickness of this tubular wall of moving material is not of great importance; but that it is desirable to have a relatively large volume in this tubular chamber compared with the area of the freezing wall; and the distance between the drum and the freezing wall will be determined by such quantities as the width of the scraping blade and the distance between the drum and the inner edge of the blade.

I have found that the scraping blade may be any width between ¾" and 2½" and for any given width it should engage the freezing wall at a suitable scraping angle, that is to say, at an angle not so obtuse that the blade edge will tend to "stub" along on or jab into the freezing wall nor an angle so acute that the edge will not bite into the film of ice cream and scrape it off cleanly and this angle will be different for different widths of blades and different diameters of scraping wall but the angle of the blade to the wall will be evidence by the mechanics of the hingingly movable blade and will be apparent to a skilled designer.

I have found also that while it is desirable to have a considerable radial space or clearance between the inner edge of the scraping blade and the periphery of the drum, so as not to unduly restrict the flow of ice cream under the blades, this space need not be large. Even if this distance between the blade edge and the drum is decreased to as small an amount as ⅛" for blades of the above mentioned width, the ice cream nevertheless will flow therethrough, the mixture behaving in general like any viscuous liquid which, as is well known, increases its velocity to pass through a restriction without undue loss of propelling energy.

I have found that for a cylinder 11¼" inside diameter and 40" long, with four scraper blades, and revolving at 200 revolutions per minute, and with a refrigerant temperature at the average of the above mentioned range, and for a mix supply temperature of 34° to 35° Fahrenheit, the delivery will be approximately 250 gallons per hour.

The flow rate can be adjusted by the valve 70 to deliver ice cream within the desired delivered temperature range in accordance with whatever refrigerant temperature, within the said range, is available. This is one of the advantages of my invention.

It should be noted that the temperature range within which the above described freezer will successfully operate is a relatively great temperature range and therefore enables successful operation of the apparatus by refrigerating plants, the major part of the output of which is utilized for other purposes. In prior known constructions of apparatus a temperature as low as —5° Fahrenheit to —20° Fahrenheit has been essential to produce ice cream at all.

As stated above, no regulation of temperature is necessary. In refrigerating plants supplying refrigeration for ice cream freezing with the above described apparatus incidental to the other uses of the refrigerating plant, changes of temperature at the freezer 12 will occur slowly or gradually and the operator can detect changes in the ejected ice cream temperature and correspondingly change the adjustment of the flow valve 70 to maintain a uniform ice cream. But, if desired, a temperature regulator may be employed in the line of the pipe 102 as indicated at 103. This regulator may comprise a sylphon operated valve controlled by a bulb 104 in thermal engagement with the conduit 102 to control the flow of refrigerant therethrough to maintain the temperature constant. Such control valves are so well known in the art that no description or illustration thereof other than that referred to is deemed necessary.

If, due to any unforeseen cause or to lack of proper supervision, the flow rate should be decreased or the temperature should fall, or both, so that the ice cream in the freezer 12 should freeze solid and stop the machine, it may be thawed out and started again in the following manner. A pipe 105 connected to the "hot" side of the refrigerating system may, upon opening a valve 106 and closing a valve 107 in the line of the pipe 34, admit "hot" refrigerant to the chamber 20 and back through the pipe 33 to quickly raise the temperature of the ice cream in the freezer, and after it has thawed and the apparatus has started again, the valves may be reversed to restore refrigeration to the freezer.

In the modification of the refrigerating means illustrated in Figs. 9 and 10, the pipe 33 conducting refrigerant from the apparatus 35, extends through the head 25 and into the chamber 20. In the preferred construction, the pipe 33 is coupled to a tube 107 projecting through a bore 125 and having a flange 108 by which the bore may be sealed and the tube mounted on the head. The inner end of the tube 107 projects into the chamber 20 and has threaded into the end thereof a nozzle piece 109. This nozzle piece has a relatively thick walled end and the end is provided with a plurality, such as three, bores or nozzles 110, 111 and 112 of small diameter. The nozzles 110, 111 and 112 constitute collectively an expansion device or valve at which, when refrigerant under pressure is supplied through the pipe 33 to the tube 107, it will be forced out through the said nozzles and caused to expand within the chamber 20.

It is not intended that the expansion into the chamber 20 shall convert the refrigerant all into gas or vapor, the said bores or nozzles being of such size that streams of refrigerant will be projected outwardly therefrom. The bores are inclined or directed so that the liquid refrigerant forced therethrough will be directed upon the upper side of the wall 18. The upper nozzle 110 may thus squirt or otherwise discharge liquid refrigerant over the area A in Fig. 9; the nozzle 111 over the area B and the nozzle 112 over the area C. Thus liquid refrigerant will be directed to and upon the entire upper surface of the wall 18 in the chamber 20 and some of the refrigerant will be converted into vapor.

It is intended that there shall always be a surplus of liquid and this liquid refrigerant, see Fig. 10 thus deposited on the upper side of the wall 18, flows downwardly thereover in a film, as shown at 113, completely coating the wall 18 and the surplus liquid drops off at the underside of the chamber, as shown at 114 to be returned in the circulation of the system. The chamber 20 outwardly of the film 113 will be filled with refrigerant expanded into vapor.

I have found that for a given temperature of refrigerant vapor in the chamber 20 a much more rapid transfer of heat will occur through the wall 18 because of the liquid film 113. This may be explained by the fact that the liquid 113 in contact with the wall 18 will conduct heat from the wall more rapidly than would vapor in contact with the wall, and vapor in contact with the liquid 113 will conduct heat from the liquid more rapidly than would the vapor conduct heat directly from the wall 18. Thus there is a double gain in thermal efficiency, the liquid film 113 receiving transferred heat more rapidly and passing it on to the gas in the chamber more rapidly. It will be apparent that the film 113 is kept cold by the cold vapor surrounding it and thus the wall 18 is kept cold by the cold liquid film 113 thereon so that for a given temperature of refrigerant, the wall 18 will always be colder than with the usual arrangement.

In Fig. 11 is illustrated a modification of the refrigerating part of the apparatus of Fig. 1. In this figure, the freezing chamber 38 is reproduced as surrounded by the wall 18 and the refrigerating chamber 20 therearound is illustrated as in Figs. 9 and 10. A tube 107 discharges into the chamber 20 as described in connection with Figs. 9 and 10 discharging gas and flooding the outside surface of the wall 18 with liquid.

To provide refrigerant to the nozzle tube 107, I provide a receiver 118 having refrigerant liquid 119 therein subjected to pressure above the surface of the liquid in a manner to be described. A pipe 102 projected sealedly through the wall of the receiver 118 projects at its lower end into the liquid and at its upper end is connected to the nozzle tube 107 and the rate of flow may be controlled by a valve 121.

At the opposite end of the chamber 20 is a pipe 122 projecting into the chamber 20 and this pipe drains away from the chamber 20 the liquid refrigerant and gaseous refrigerant, both, and discharges them at the lower end of the pipe 122, into a sealed separator 123 comprising a box or like vessel of suitable material to be sealed and to contain gaseous and liquid refrigerants.

Of the refrigerant discharged into the receiver 123 by the pipe 122, the liquid part remains at the bottom and collects as at 124, normally immersing the lower end of the pipe 122; and the gaseous part of the refrigerant leaves the liquid and goes out from the upper part of the receiver 123 by way of a pipe 125 sealedly projecting into an upper part of the receiver.

The other end of the pipe 125 communicates with the intake side of a pump 127. The outlet side of the pump 127 communicates by a pipe 128 with a condenser 129 which may be of usual well known construction and the condenser communicates by a pipe 130 with the receiver 118, discharging compressed and cooled liquid refrigerant thereinto from an upper part thereof.

The liquid refrigerant at 124 in the separator 123, as it accumulates therein, may be pumped or otherwise drawn out therefrom by way of a pipe 131 sealedly projecting through the wall of the separator 123 and into the liquid adjacent the lower part thereof and may discharge into the receiver 118 by a pipe 132 sealedly projecting into an upper portion thereof. Preferably this discharge of the liquid 124 is made automatic by a float 133 which operates a mercury tube switch 134 to which are connected electric wires 135 and 136 which sealedly pass outwardly through the wall of the receiver and are supplied with electric current from mains 137 controlled by a switch 138 and energizing a motor 139 which drives a pump 140 in the line of the pipes 131—132 to draw the liquid 124 from the separator and pump it into the receiver.

In the preferred construction, the pipe 131 between the receiver 123 and the pump 140 is provided with a check valve 146 to prevent flow backwardly therethrough, for example when the pump 140 is not running. And preferably also, an electro-magnetic valve 147 is provided in the line between the receiver and the pump which is normally closed and which is operated to open when the motor 139 is de-energized to operate the pump.

Any suitable construction of magnetic valve may be provided for this purpose. In the form illustrated, a piston 148 reciprocates in a cylinder 149 and has a duct 150 registerable with a pair of ducts 151—151. Normally the piston is held down against the stop 152 by a spring 153 and is adapted to be raised by a plunger 154 energized by a winding 155. Preferably the winding 155 is placed in series with the motor 139 so that it is insured that both or neither will operate. When the winding 155 is energized, the piston 147 is raised and opens communication from the pipe 131 to the pipe 132, as will be understood.

A check valve 141 also is provided in the line of the pipe 132 as an added precaution.

A pressure operated valve 156 is provided in the line of the pipe 125 to maintain the outlet temperature of vapor in line 125 at substantially constant temperature to control the temperature automatically of the chamber 20. Such a pressure operated valve is well known in this art and need not be described nor illustrated in detail here; and it is believed that the mode of operation of such valve is so well understood in the refrigerating art that no further description thereof is necessary.

If desired, a by-pass 142 may be provided around the pump 127 provided with a spring press check valve 143.

In the operation of this freezer refrigerating system, it will be observed that the liquid and the gas leaving the refrigerating chamber 20 are returned to the receiver 118 separately, the liquid going directly and the gas being first condensed into liquid and then supplied to the receiver. The pump 140 pumps only liquid and the pump 127 pumps only gas.

Heretofore, insofar as I am aware, refrigerating systems have fallen generally into two classes, namely, the expansion system and the so-called flooded system. The system illustrated and described in connection with Fig. 11 is more nearly of the expansion system class but it will be observed that it is not subject to the objection that it becomes "bound" by accumulating liquid in the gas pump and condenser, the return gas being separated from return liquid. On the other hand, the system does not have the objection that the flooded system has such as accumulating oil, etc. It is therefore a combined flooded and expansion system having the advantages without the disadvantages of both.

The refrigeration in the chamber 20 is accomplished by both liquid and gas, the liquid being pumped directly thereto and sprayed thereinto and the gas being formed by the expansion of the liquid. Preferably, the spraying nozzle described in connection with Figs. 9 and 10 will supply two or three times as much liquid as would ordinarily be necessary to effect the refrigeration. There will always be liquid returning out of the refrigerator by the pipe 122 as well as gas therefrom. By separating the two and returning them separately as liquid to the receiver 118, all of the advantages of both the expansion and the flooded type systems may be had without the disadvantages thereof.

The pressure in the receiver 118 will be controlled by the valve 156 on the intake side of the pump which, if necessary, may starve the intake; and the pump 140 cannot pump into the receiver more liquid than accumulates in the reservoir at 124.

The foregoing description of the operation of the above described apparatus, while applying specifically to the making of ice cream, ice cream mix, applies in many respects to the processing of other materials such as those referred to hereinbefore.

If desired, and as will be obvious, the pump 10 may be duplicated and a separate pump provided for pumping into the chamber 38, different materials which are to be combined within the chamber and the wall 18 of the chamber 38 may be refrigerated, as above described, or as will be obvious may be heated by heat supplied in the form of hot liquid or steam through the pipe 33.

For this purpose the refrigerant source may be cut off by closing valves 107 and 157 and a source of heat 158 may be cut in by opening valves 159 and 160 and 106 whereupon hot liquid or steam may flow to the conduit 33 from the source by a conduit 161 and return by a conduit 162.

A range of temperature therefore from 0° to 350° Fahrenheit may readily be attained at the processing wall 18 on which the scrapers revolve and the improved scraping, agitating and mixing operations performed by the drums, blades, blade supports, etc., may be performed on all materials sent through the chamber 38. My invention therefore is not limited to the application to the manufacture of ice cream but embraces in its scope the processing of all materials singly or in combination which may be pumped through the chamber 38 and whether the temperature thereof is raised or lowered by the temperature of the wall 18.

The refrigerating system above described may be a part of a general refrigerating system, in which case a pipe 163 under control of a valve 164 may supply refrigerant to a point of use 165, and it may return to the pipe 125 by a pipe 166.

My invention is not limited to the exact details of construction shown and described. Further changes and modifications may be made within the spirit of my invention without sacrificing its advantages and within the scope of the appended claims.

I claim:

1. In a continuous fluid material congealing apparatus, a chamber having a surrounding wall, means to externally refrigerate it, a drum rotatably supported substantially co-axially in the chamber and substantially smaller in cross sectional area than the cross sectional area of the chamber, providing a tubular chamber between the drum and the wall, means to force material to be congealed into and through the tubular chamber while concurrently agitating it, and out therefrom, the drum at the discharge end of the chamber being of increased diameter to decrease the cross sectional area of the tubular chamber to restrict flow therethrough and create pressure therein.

2. In a continuous fluid material congealing apparatus, a chamber having a surrounding wall, means to externally refrigerate it, a drum rotatably supported co-axially in the chamber and of smaller cross sectional area than the chamber, means to cause the material to be congealed to flow into and through the chamber between the wall and the drum while concurrently agitating it and out therefrom, a plurality of blade supports on the drum, a blade hingingly supported on the support and scrapingly engaging the chamber wall upon rotation of the drum, the supports having inclined generally helicoidal surfaces disposed to exert upon the contents of the chamber a pumping action opposing the flow therethrough and creating back pressure in the chamber.

3. In a continuous fluid material congealing apparatus, a main chamber having a surrounding wall, means to externally refrigerate it, a rotor in the chamber comprising a drum of substantially smaller cross sectional area than the cross sectional area of the chamber, means to force material to be refrigerated into the chamber and therethrough between the wall and the drum while concurrently agitating it and out therefrom, a transverse wall at the discharge end of the chamber spaced longitudinally from the adjacent end of the drum and providing a transverse end chamber, a tubular rotary bearing in said end chamber for rotatably supporting the said drum end and having internal communication with conduit means outside of the end chamber, a passageway through the wall of the tubular bearing for discharging congealed material from the end chamber to the outside conduit means.

4. In a continuous fluid material congealing apparatus, a main chamber having a surrounding wall, means to externally refrigerate it, a rotor in the chamber comprising a drum of substantially smaller cross sectional area than the cross sectional area of the chamber, means to force fluid material to be congealed into the chamber and therethrough between the wall and the drum while concurrently agitating it and out therefrom, a transverse wall at the discharge end of the chamber spaced longitudinally from the adjacent end of the drum and providing a transverse end chamber, a tubular rotary bearing in said end chamber for rotatably supporting the said drum end and having internal communication with conduit means outside of the end chamber, a passageway through the wall of the tubular bearing for discharging congealed material from the end chamber to the outside conduit means and the passageway being of sufficiently restricted area to create back pressure in the main chamber.

5. In a fluid material congealing apparatus, a congealing chamber having an inner wall circular in cross section, a drum of smaller diameter than the chamber wall rotatable therein, a plurality of supports projecting radially from the drum in longitudinal rows, aligned grooves in the supports of each row, a scraper blade having an inner edge rockingly seated in the aligned grooves of each row, and having an outer sharpened edge engaging the cylinder wall.

6. In a fluid material congealing apparatus, a congealing chamber having an inner wall circular in cross section, a drum of smaller diameter than the chamber wall rotatable therein, a plurality of supports projecting radially from the drum in longitudinal rows, aligned grooves in the supports of each row, a scraper blade having an inner edge rockingly seated in the aligned grooves of each row, and having an outer sharpened edge engaging the cylinder wall and means to prevent endwise shifting of the blades, comprising a pin projecting from a support and extending loosely through a perforation in the blade.

7. In a fluid material congealing apparatus, a congealing chamber having an inner wall of circular cross section, a drum of smaller diameter than the chamber wall rotatable therein, a plurality of supports projecting radially from the drum in longitudinal rows, aligned grooves in the supports of each row, a scraper blade having an inner edge rockingly seated in the aligned grooves of each row, and having an outer sharpened edge engaging the cylinder wall, the blades being thin enough to flex longitudinally and conform to longitudinal irregularities of the chamber surface.

8. In a continuous ice cream freezer, a freezing chamber having a rotary drum therein, scraper blades hinged to the drum and engaging the chamber wall, means for forcing ice cream mix through the chamber, refrigerating means to refrigerate the chamber wall to cause the portion of the mix contacting it to freeze thereon and be scraped off by the scraper blades, and the diameter of the chamber, the number of blades and the velocity of rotation of the drum being such that the blades make successive scrapes at a given point on the chamber wall at the rate of between 450 and 1,000 per minute.

9. In a continuous ice cream freezer, a freezing chamber having a rotary drum therein, scraper blades hinged to the drum and engaging the chamber wall, means for forcing ice cream mix through the chamber, refrigerating means to refrigerate the chamber wall to cause the portion of the mix contacting it to freeze thereon and be scraped off by the scraper blades, means to force the ice cream mix through the chamber at such rate that the frozen mix portion is scraped off at the rate of 100 to 300 scrape-revolutions per gallon of ice cream forced through the chamber.

10. In a continuous ice cream freezer, a freezing chamber having a rotary drum therein, scraper blades hinged to the drum and engaging the chamber wall, means for forcing ice cream mix through the chamber, refrigerating means to refrigerate the chamber wall to cause the portion of the mix contacting it to freeze thereon and be scraped off by the scraper blades, the refrigerating means withdrawing heat from the chamber at such rate and the mixture being forced through the chamber at such rate that the ice cream leaving the chamber has a temperature of between 19° and 23° Fahrenheit.

11. In a heat transfer apparatus for refrigerating fluid material, a material containing chamber having a wall of circular cross section, a rotary drum rotatable in the chamber and provided with scrapers to continuously scrape congealed material from the wall, means to refrigerate the wall comprising a closed chamber surrounding the wall, a nozzle element projected into the chamber, a source of refrigerant and conduit means for supplying liquid refrigerant under pressure to the nozzle means, the nozzle means provided with a discharge orifice of small area for continuously expandingly discharging refrigerant both gaseous and liquid into the chamber and for directing the refrigerant upon the outside of the said wall and the liquid part of the discharge refrigerant being great enough to flow over and continuously maintain a film of liquid refrigerant on the said wall, and means to conduct expanded refrigerant from the chamber back to the refrigerant source.

12. In a heat transfer apparatus for refrigerating fluid material, a material containing chamber having a wall of circular cross section, a rotary drum rotatable in the chamber and provided with scrapers to continuously scrape congealed material from the wall, means to refrigerate the wall comprising a closed chamber surrounding the wall, a nozzle element projected into the chamber, a source of refrigerant and conduit means for supplying liquid refrigerant under pressure to the nozzle means, the nozzle means provided with a discharge orifice of small area for continuously expandingly discharging refrigerant both gaseous and liquid into the chamber and for directing the refrigerant upon the outside of the said wall and the liquid part of the discharge refrigerant being great enough to flow over and continuously maintain a film of liquid refrigerant on the said wall, conduit means to conduct expanded refrigerant from the chamber, a separator for separating the liquid refrigerant from the gaseous refrigerant and conduit means conducting the liquid refrigerant back to the source, means to condense the gaseous refrigerant and then conduct it back to the source.

13. In a heat transfer apparatus for refrigerating fluid material, a material containing chamber having a wall of circular cross section, a rotary drum rotatable in the chamber and provided with scrapers to continuously scrape congealed material from the wall, means to refrigerate the wall comprising a closed chamber surrounding the wall, a nozzle element projected into the chamber, a source of refrigerant and conduit means for supplying liquid refrigerant under pressure to the nozzle means, the nozzle means provided with a discharge orifice of small area for continuously expandingly discharging refrigerant both gaseous and liquid into the chamber and for directing the refrigerant upon the outside of the said wall and the liquid part of the discharge refrigerant being great enough to flow over and continuously maintain a film of liquid refrigerant on the said wall, and conduit means to conduct expanded refrigerant from the chamber, a separator for separating the liquid refrigerant from the gaseous refrigerant, a pump and conduit means to return liquid refrigerant from the separator to the source, a pump and conduit means and a condenser to conduct gas refrigerant from the receiver, condense it to liquid and conduct it back to the source.

14. In a refrigerating system, a walled chamber to be refrigerated, a rotary drum rotatable in the chamber and provided with scrapers for scraping congealed material from the wall, a closed chamber surrounding the wall, a nozzle element projecting into the chamber, a source of refrigerant comprising a receiver and liquid conduit therein under pressure, conduit means for conducting liquid from the receiver to the nozzle means, the nozzle means having a discharge orifice of small area for continuously expandingly discharging liquid refrigerant both gaseous and liquid into the chamber and directing it upon the outside of said chamber wall, the liquid portion of the discharged refrigerant being great enough to flow over and continuously maintain a film of liquid refrigerant on the said wall, a separator, conduit means for conducting expanded refrigerant from the chamber to the separator, a wall in the separator for receiving liquid refrigerant, a pump for pumping said liquid refrigerant from the wall to the receiver, a conduit leading from the separator above the liquid in the wall to conduct gaseous refrigerant therefrom, a condenser, conduit means and a pump for pumping said gaseous fluid from the separator through the condenser and as liquid pumping it into the receiver.

15. In a continuous fluid material congealing apparatus, a chamber having a surrounding wall, means to externally refrigerate it, a drum rotatably supported in the chamber and being substantially smaller in cross sectional area than the cross sectional area of the chamber, providing a tubular chamber between the drum and the wall, means to force material to be congealed into and through the tubular chamber and out therefrom, the tubular chamber being reduced in cross sectional area adjacent the discharge end thereof to restrict flow therethrough.

16. In a continuous fluid material congealing apparatus, a chamber having a surrounding wall, heat exchange medium associated therewith, a rotor disposed coaxially in the chamber and substantially smaller in cross sectional area than the chamber, means to cause the material to be congealed to flow into and through the chamber between the wall and the rotor while concurrently agitating the same, a plurality of scraper means associated with the rotor and scrapingly engaging the chamber wall upon rotation of the rotor, means associated with said scraper means adapted to propel the material against the direction of inflow whereby the material has a pumping action exerted thereon.

17. In a continuous material handling apparatus, a chamber having a surrounding wall, heat exchange medium associated therewith, a rotor disposed coaxially in the chamber and substantially smaller in cross sectional area than the chamber, means to cause the material to be treated to flow into and through the chamber between the wall and the rotor while concurrently agitating the same, a plurality of scraping means associated with the rotor and scrapingly engaging the chamber wall upon rotation of the rotor, means adjacent the rotor adapted to pump the material and to propel the material against the direction of inflow.

18. In a continuous material handling apparatus, a chamber having a surrounding wall, heat exchange medium associated therewith, a rotor disposed coaxially in the chamber and substantially smaller in cross sectional area than the chamber, means to cause the material to be treated to flow into and through the chamber between the wall and the rotor while concurrently agitating the same, a plurality of scraping means scrapingly engaging the chamber wall upon rotation of the rotor, and directing the material downwardly to means adjacent the rotor to subject said material to a whirling movement thereabout, the material having a pumping action exerted thereon by said means adjacent the rotor and being propelled thereby against the direction of inflow, said opposed flow being overcome by the pressure of the main flow.

19. In a continuous material handling apparatus, a chamber having a surrounding wall, heat exchange means associated therewith, a rotor disposed coaxially in the chamber and substantially smaller in cross sectional area than the chamber, means to cause the material to be treated to flow into and through the chamber between the wall and the rotor while concurrently agitating the same, a plurality of scraping means scrapingly engaging the chamber wall upon rotation of the rotor, means adjacent the rotor adapted to subject the material to a whirling movement thereabout and to exert a pumping action thereon and to propel the material against the direction of inflow.

20. A method of processing fluid or semi-fluid materials whereby the materials which are introduced into a chamber, having a heat exchange medium associated therewith, are subjected to a plurality of movements in said chamber substantially simultaneously, said movements comprising movement in the main flow direction, rotation about the circumference of the chamber and at a plurality of positions axially thereof, and movement in the opposed inflow direction, the pressure in the main flow direction being sufficient to overcome the pressure in said opposed direction whereby the materials are discharged in a substantially homogeneous form sustaining mass.

ALMOND C. ROUTH.